Patented Dec. 11, 1928.

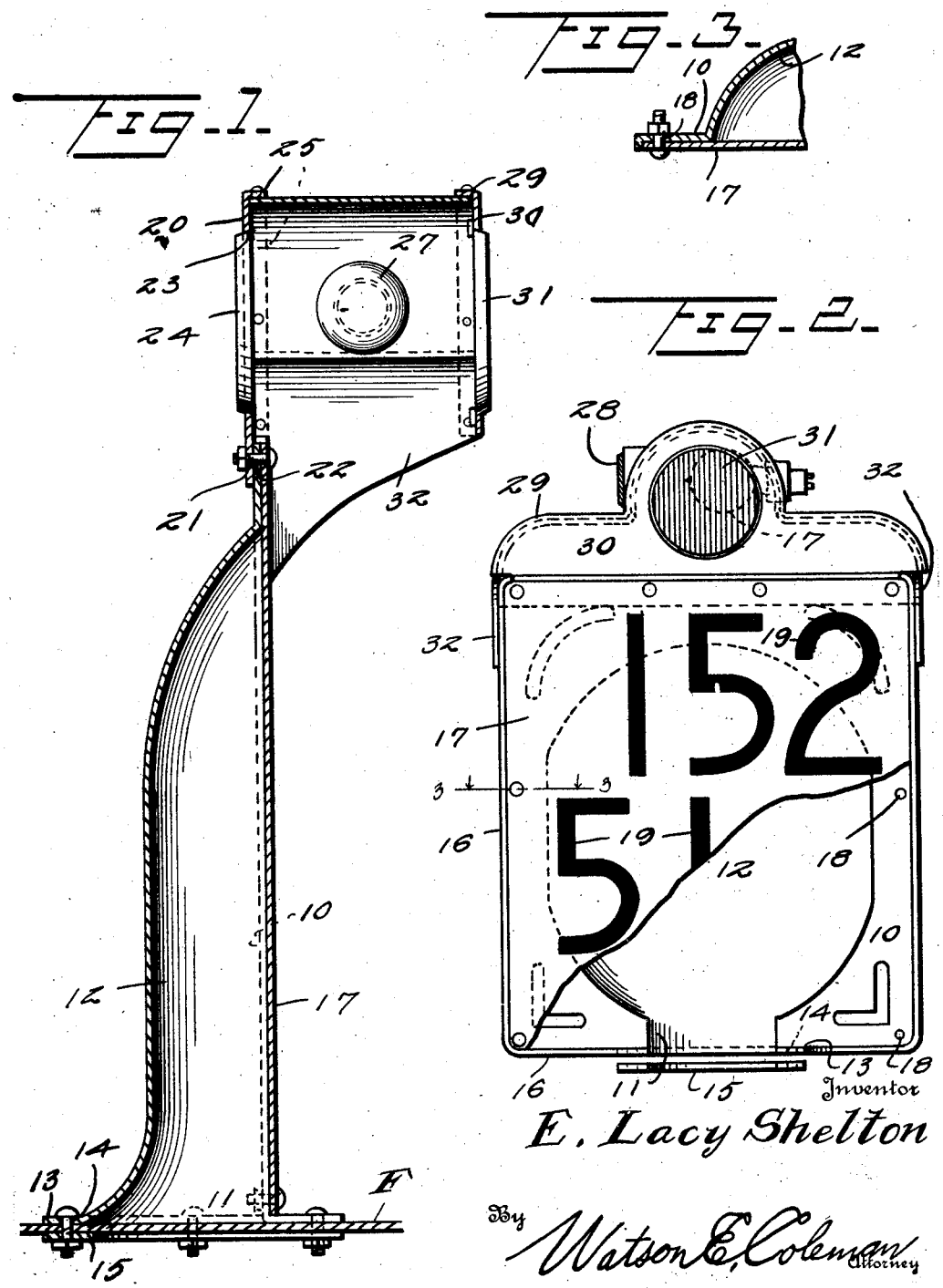

1,694,832

UNITED STATES PATENT OFFICE.

EDWARD LACY SHELTON, OF MEMPHIS, TENNESSEE.

LICENSE-PLATE HOLDER.

Application filed March 24, 1928. Serial No. 264,376.

This invention relates to license plate holders and to a license plate for use therewith.

An important object of the invention is to produce a license plate holder which may be readily attached to the fenders of an automobile, and, therefore, disposed in a position where it may be readily viewed and which is so constructed that the application of a light thereto may be readily made.

A further object of the invention is to produce a license plate of such character that it may be employed upon a holder secured to the fender of the vehicle without projecting so far to the side of the vehicle that it is liable to engage other vehicles or against persons passing close to the vehicle to which it is applied.

A further object of the invention is to provide a structure such that the tail light may be positioned where it can be readily observed and where it can act as a parking or warning light indicating the position of the vehicle to passing motors.

These and other objects I attain by the construction shown in the accompanying drawing, wherein for the purpose of illustration is shown a preferred embodiment of my invention and wherein:—

Figure 1 is a vertical sectional view through a license plate and mounting therefor constructed in accordance with my invention;

Figure 2 is a front elevation thereof;

Figure 3 is a detail sectional view on the line 3—3 of Figure 2.

Referring now more particularly to the drawing, the license plate holder comprises a rectangular metallic sheet 10 having at the center of its lower edge an extension 11. The sheet 10 and its extension 11 are centrally concavely shaped, as indicated at 12, the extension 11 by this operation being formed as a substantially semi-cylindrical neck, the end of which has a horizontal flange 13 adapted to seat upon the upper surface of the fender F of the vehicle. This flange is perforated, as at 14, for the passage of securing elements which may also pass through the fender F and a substantially U-shaped washer plate 15 arranged upon the under surface of the fender. This plate at its bottom and side edges is provided with outstanding flanges 16 of a depth corresponding to the thickness of the license plate 17 to be employed therewith and is formed with perforations 18 for the passage of securing elements which are likewise passed through the license plate 17. This license plate is substantially square in form, the numerals or identifying indicia 19 thereof being arranged in superimposed groups instead of in a continuous group as in the ordinary license plate. Such a license plate will have substantially one-half the width of the ordinary license plate and a greater depth and will not necessitate a holder 10 which will project beyond the limits of the fender F when applied thereto.

One of these holders can be applied to the left rear fender with the plate 17 facing rearwardly and a second holder may be applied to the right front fender of the license plate facing forwardly.

In combination with the former holder, I provide a light casing comprising a rear wall 20 in the form of a plate adapted to be secured to the license plate holder by securing elements directed through the openings 21 formed in the lower edge of the rear wall 20 and openings 22 formed in the upper edge of the holder 10. This rear wall at its center has an opening 23 and about this opening is provided with means for securing a lens 24 in applied position. About its edges, the rear wall is provided with a forwardly turned flange 25 adapted to engage a side wall 26 centrally-shaped to produce a light housing for an incandescent bulb 27. One side of this housing has an opening provided with a lens 28 and the front edge thereof receives the flanged edge 29 of the front wall 30 bearing a lens 31. The lens 31 is preferably red and takes the place of the ordinary tail light. The front lens 24 may be provided with a clear or amber lens directing light forwardly. The lens 28 is preferably given a distinctive color, such as green.

It will be obvious that a light of this character will, during movement of the vehicle, take the place of the ordinary tail light and when the vehicle is parked, may be employed as a parking light. Due to its position, it may be readily observed by the driver to determine whether it is in operation or not.

It will be obvious that by employing a structure of this character, the license plate may be so positioned that it is readily observed and, at the same time, will be arranged within the confines of the vehicles and in a position where it is not liable to contact with persons or vehicles. Each bracket if desired, can have applied thereto by stamping the name of the State in which the vehicle owner resides and an identifying number.

It will also be obvious that the construction hereinbefore set forth is capable of a certain range of change and modification without materially departing from the spirit of the invention and I accordingly do not limit myself to such specific structure except as hereinafter claimed.

I claim:—

1. A license plate holder comprising a rectangular metallic sheet having at its lower end an extension, said sheet at its central portion being concavely depressed and the depression extending into said extension to produce therefrom a semi-circular neck, the lower end of said neck having a flange adapted to seat upon a vehicle, the sheet having openings for the passage of securing elements for attaching a license plate thereto.

2. A license plate holder comprising a rectangular metallic sheet having at its lower end an extension, said sheet at its central portion being concavely depressed and the depression extending into said extension to produce therefrom a semi-circular neck, the lower end of said neck having a flange adapted to seat upon a vehicle, the sheet having openings for the passage of securing elements for attaching a license plate thereto, the lower and side edges of said plate having outstanding flanges upon the front face thereof.

3. A license plate holder comprising a rectangular metallic sheet having at its lower end an extension, said sheet at its central portion being concavely depressed and the depression extending into said extension to produce therefrom a semi-circular neck, the lower end of said neck having a flange adapted to seat upon a vehicle, the sheet having openings for the passage of securing elements for attaching a license plate thereto, the lower and side edges of said plate having outstanding flanges upon the front face thereof and a light housing detachably engaged with the upper edge of the sheet and jutting forwardly from the sheet.

In testimony whereof I hereunto affix my signature.

EDWARD LACY SHELTON.